(12) United States Patent
Daniyalzade et al.

(10) Patent No.: US 11,238,455 B1
(45) Date of Patent: Feb. 1, 2022

(54) SYSTEM AND METHOD FOR LOCATION-BASED FRAUD PREVENTION

(71) Applicant: Walmart Apollo, LLC, Bentonville, AR (US)

(72) Inventors: Eytan Daniyalzade, San Francisco, CA (US); Berk Atikoglu, San Francisco, CA (US); David Nelms, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 63 days.

(21) Appl. No.: 16/261,185

(22) Filed: Jan. 29, 2019

Related U.S. Application Data

(60) Provisional application No. 62/623,464, filed on Jan. 29, 2018, provisional application No. 62/623,470, filed on Jan. 29, 2018, provisional application No. 62/623,474, filed on Jan. 29, 2018.

(51) Int. Cl.
| | |
|---|---|
| *G06Q 20/40* | (2012.01) |
| *H04W 4/021* | (2018.01) |
| *G06Q 20/32* | (2012.01) |
| *H04W 4/029* | (2018.01) |
| *H04M 1/72403* | (2021.01) |

(52) U.S. Cl.
CPC ..... *G06Q 20/4016* (2013.01); *G06Q 20/3221* (2013.01); *H04M 1/72403* (2021.01); *H04W 4/021* (2013.01); *H04W 4/029* (2018.02)

(58) Field of Classification Search
CPC .............. G06Q 30/0201; G06Q 20/12; G06Q 20/3224; G06Q 20/4016; G06Q 30/0281; G06Q 40/08; G06F 16/639; G06F 16/683; G07C 5/008; H04M 1/72569; H04M 2250/12; H04W 12/06
USPC ...... 705/14.45, 22, 26.3, 26.41, 39, 76, 345, 705/346; 707/758; 715/744, 746; 463/35
See application file for complete search history.

(56) References Cited

U.S. PATENT DOCUMENTS

| | | | |
|---|---|---|---|
| 6,522,772 | B1 | 2/2003 | Morrison et al. |
| 8,880,434 | B2 | 11/2014 | Bemmel et al. |
| 9,641,489 | B1* | 5/2017 | Kaufman ............... H04L 9/0872 |
| 9,665,896 | B2 | 5/2017 | Atikoglu et al. |
| 2003/0018522 | A1 | 1/2003 | Denimarck et al. |
| 2004/0133477 | A1 | 7/2004 | Morris et al. |
| 2006/0265286 | A1* | 11/2006 | Evangelist ........... G06Q 20/203 705/22 |
| 2007/0129056 | A1 | 6/2007 | Cheng et al. |

(Continued)

*Primary Examiner* — Alexander G Kalinowski
*Assistant Examiner* — Sanjeev Malhotra
(74) *Attorney, Agent, or Firm* — Bryan Cave Leighton Paisner LLP

(57) ABSTRACT

Various embodiments can include a system for the prevention of fraud. The system can comprise one or more processors and one or more non-transitory memory storage devices storing computing instructions. The computing instructions can be configured to run on the one or more processors and can perform: receiving an indication from a software application on a mobile device of a user that the mobile device has broken a first geofence; calculating a risk score for a first user account of the user; and prompting the user for additional information via the mobile device when the risk score is below a predetermined value. Other embodiments are disclosed herein.

20 Claims, 7 Drawing Sheets

(56) References Cited

U.S. PATENT DOCUMENTS

| | | | |
|---|---|---|---|
| 2008/0046366 A1 | 2/2008 | Bemmel et al. | |
| 2009/0089215 A1* | 4/2009 | Newton | G06Q 20/40 705/76 |
| 2009/0152343 A1 | 6/2009 | Carter et al. | |
| 2012/0259732 A1 | 10/2012 | Sasankan et al. | |
| 2013/0041837 A1* | 2/2013 | Dempski | G06Q 30/0201 705/345 |
| 2013/0112746 A1 | 5/2013 | Krell | |
| 2013/0254674 A1* | 9/2013 | Pekofsky | G06F 8/38 715/744 |
| 2014/0012739 A1* | 1/2014 | Wall | G06Q 20/20 705/39 |
| 2014/0058895 A1* | 2/2014 | Herron | G06Q 30/0613 705/26.41 |
| 2014/0082516 A1* | 3/2014 | Huang | G06F 9/451 715/746 |
| 2014/0095296 A1* | 4/2014 | Angell | G06Q 30/0246 705/14.45 |
| 2014/0244514 A1 | 8/2014 | Rodriguez et al. | |
| 2015/0231493 A1* | 8/2015 | Hain | A63F 13/23 463/35 |
| 2015/0332388 A1* | 11/2015 | Ziegenfus | G06Q 30/08 705/26.3 |
| 2016/0019608 A1* | 1/2016 | Smith | G06F 3/0611 705/346 |
| 2016/0196344 A1* | 7/2016 | Cremer | G06F 16/639 707/758 |
| 2016/0224970 A1* | 8/2016 | Pama | G06Q 20/42 |
| 2016/0292269 A1* | 10/2016 | O'Driscoll | G06F 16/636 |
| 2017/0270559 A1 | 9/2017 | Zimmerman et al. | |
| 2017/0287034 A1* | 10/2017 | Barday | G06Q 50/265 |
| 2017/0300885 A1* | 10/2017 | Niehaus | G06Q 20/145 |
| 2018/0063178 A1* | 3/2018 | Jadhav | H04L 45/74 |
| 2018/0082386 A1* | 3/2018 | Arquero | G06Q 50/14 |
| 2018/0083950 A1* | 3/2018 | Cicchitto | H04L 63/083 |
| 2018/0285977 A1* | 10/2018 | Cleary | G06Q 40/08 |
| 2018/0322500 A1* | 11/2018 | Eisen | G06F 21/44 |
| 2019/0005412 A1* | 1/2019 | Matus | G06N 20/00 |
| 2019/0122453 A1* | 4/2019 | Wright | H04M 1/72409 |

* cited by examiner

SYSTEM AND METHOD FOR LOCATION-BASED FRAUD PREVENTION

CROSS REFERENCE TO RELATED APPLICATIONS

This application claims the benefit of Provisional Patent Application No. 62/623,464, filed Jan. 29, 2018, which is herein incorporated by reference in its entirety. This application also claims the benefit of Provisional Patent Application No. 62/623,470, filed Jan. 29, 2018, which is herein incorporated by reference in its entirety. This application further claims the benefit of Provisional Patent Application No. 62/623,474, filed Jan. 29, 2018, which is herein incorporated by reference in its entirety.

TECHNICAL FIELD

This disclosure relates generally to fraud prevention, and relates more particularly to location-based fraud prevention.

BACKGROUND

As brick and mortar and online retail establishments become increasingly integrated together, fraud that spans the gap between the physical and online worlds is becoming more common. Online theft and online fraud are now becoming in-person theft and in-person fraud as a stolen ecommerce account can now be used for in-store purchases. Further, customers shopping in brick and mortar retail stores do not wish to be bothered by a fraud check when they are checking out on their mobile device.

BRIEF DESCRIPTION OF THE DRAWINGS

To facilitate further description of the embodiments, the following drawings are provided in which.

Figure 1:
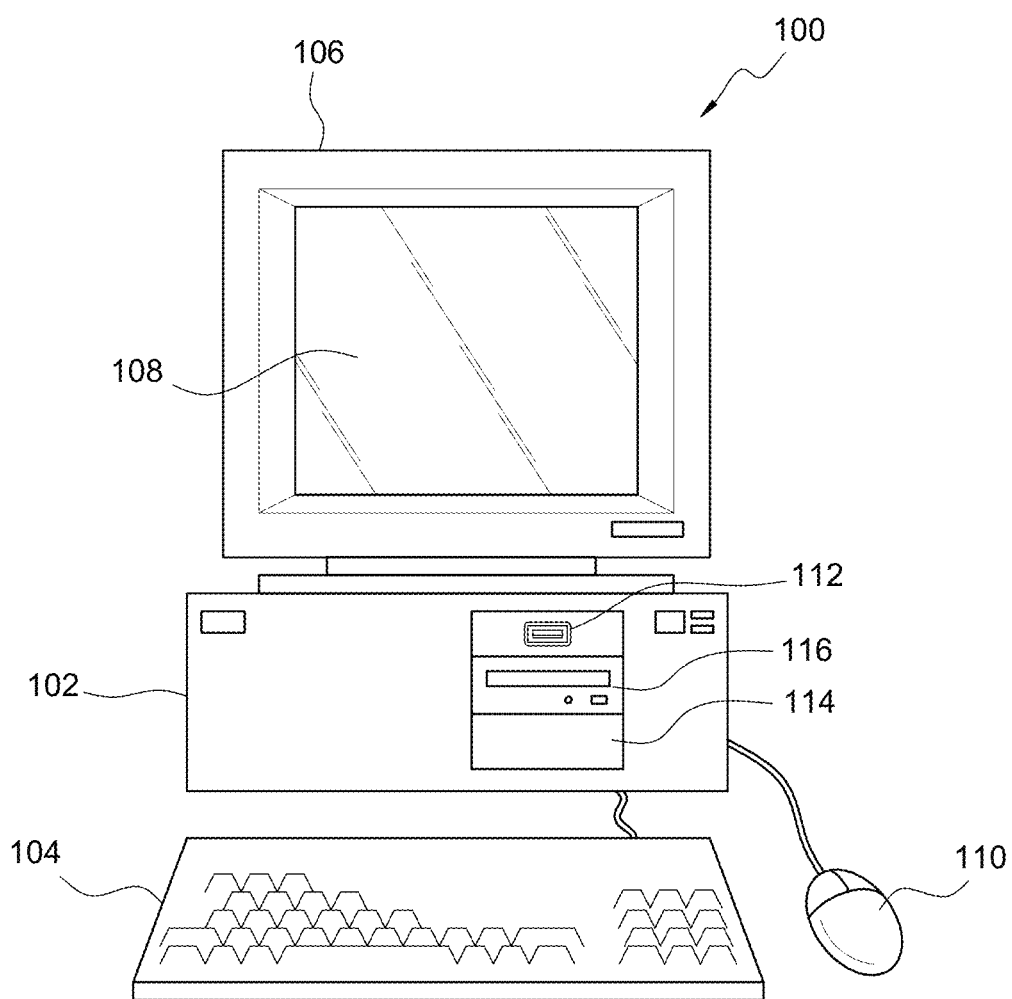
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, ten seconds, thirty seconds, one minute, five minutes, ten minutes, one hour, six hours, twelve hours, or twenty-four hours.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "brick and mortar" or "brick and mortar store" can, in some embodiments, mean a physical retail store in the real world. A retail store does not need to be constructed out of bricks and mortar to be considered "brick and mortar" or a "brick and mortar store." Buildings used as a retail store that are constructed out of timber, plaster, adobe, metal, or any other suitable building material can, in some embodiments, be considered "brick and mortar" or a "brick and mortar store."

DESCRIPTION OF THE EXAMPLE OF EMBODIMENTS

Various embodiments disclosed herein can include a system for the prevention of fraud. The system can comprise one or more processing modules and one or more non-transitory memory storage modules storing computing instructions. The computing instructions can be configured to run on the one or more processing modules and can perform acts of receiving an indication from a software application on a mobile device of a user that the mobile device has broken a first geofence; calculating a risk score for a first user account of the user; and prompting the user for additional information via the mobile device when the risk score is below a predetermined value. The risk score for the first user account can comprises an in-person activity history of the first user account, which can comprise at least one of a physical store location history of the first user account; a shopping frequency history of the first user account; or an in-store purchase history of the first user account. The risk score for the first user account can further comprise an online activity history of the first user account, which can comprise at least one of an online purchase history of the first user account or a mobile application purchase history of the first user account. The risk score for the first user account can further comprise a device specific factor of the first user account comprising at least one of an account login history of the first user account or a number of accounts history of the first user account. The risk score for the first user account can further comprise a fraudulent activity history of the first user account comprising at least one of a chargeback history of the first user account; a disputed transaction history of the first user account; a stolen account history of the first user account; an account details history of the first user account; or a payment method history of the first user account.

Other embodiments include a method for fraud prevention. This method can comprise receiving an indication from a software application on a mobile device of a user that the mobile device has broken a first geofence; calculating a risk score for a first user account of the user; and prompting the user for additional information via the mobile device when the risk score is below a predetermined value. The risk score for the first user account can comprises an in-person activity history of the first user account, which can comprise at least one of a physical store location history of the first user account; a shopping frequency history of the first user account; or an in-store purchase history of the first user account. The risk score for the first user account can further comprise an online activity history of the first user account, which can comprise at least one of an online purchase history of the first user account or a mobile application purchase history of the first user account. The risk score for the first user account can further comprise a device specific factor of the first user account comprising at least one of an account login history of the first user account or a number of accounts history of the first user account. The risk score for the first user account can further comprise a fraudulent activity history of the first user account comprising at least one of a chargeback history of the first user account; a disputed transaction history of the first user account; a stolen account history of the first user account; an account details history of the first user account; or a payment method history of the first user account.

Brick and mortar retailers today are continually expanding their reach into the online world by offering a continually growing number of their products and services online. Concurrently, these same retailers are attempting to capture new customers by joining aspects of their online presence in their brick and mortar stores. For example, many retailers now allow customers to pay for products in-store using a software application on a mobile device.

As these efforts by retailers to join their online and real world presence continue to grow, the potential for fraud is skyrocketing. Now, simply losing your mobile device can mean that a fraudster can make unauthorized purchases. Further, as the incidents of identity and online account thefts are continually rising, it is become increasingly likely that what was previously online fraud can begin to have consequences in brick and mortar stores. Thus, there is a need for a system and/or method for prevention of ecommerce fraud that takes into account factors occurring in the physical world. This need, though, presents its own problems when a customer attempts to use their mobile device to purchase items in a brick and mortar store. One such problem is that users do not want to be bothered with the hassle of verifying their identity when attempting to check out while using their mobile device, as this causes delays and can be confusing for the user. Thus, there also is a need for a fraud prevention system and/or method that prompts a potentially fraudulent user account for verification at a time that is convenient for the user. It also can be beneficial for a fraud prevention system and/or method to evaluate both in-store and online activity while prompting the user for a fraud check, if one is needed, at a convenient time.

In many embodiments, the techniques described herein can provide a practical application and several technological improvements. In some embodiments, the techniques described herein can provide for automatic computation of a risk score based upon historical user behavior. These techniques described herein can provide a significant improvement over conventional approaches of subjectively determining a risk of fraud, such as guessing by an appearance of a user or a user's body language. In many embodiments, the techniques described herein can calculate risk scores based on dynamic information that describes current conditions and/or conditions that have occurred during a same day of risk score calculation.

In a number of embodiments, the techniques described herein can advantageously provide a consistent user experience by determining a risk score based on current information and a predictive model without interrupting a user as they enter a store and/or break a geofence. In various embodiments, the techniques described herein can dynamically determine a risk score without interrupting a user's shopping experience, which can allow the user time to plan their trip, and/or allow the user to have a unified shopping experience.

In a number of embodiments, the techniques described herein can solve a technical problem that arises only within the realm of computer networks, as calculating a risk score for a mobile device does not exist outside the realm of computer networks.

Figure 2:
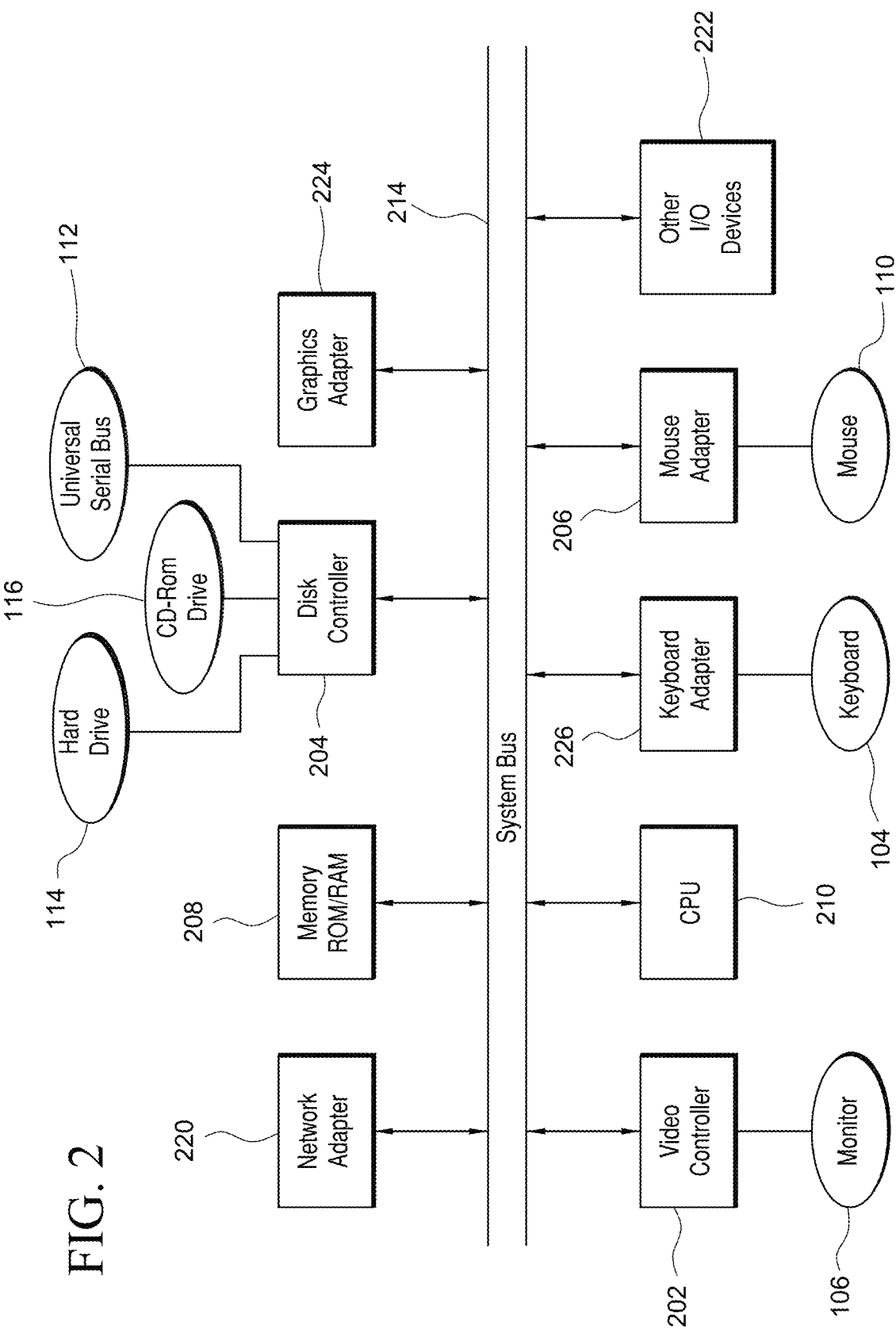
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein and/or operating part or all of one more embodiments of the memory storage modules described herein. As an example, a different or separate one of a computer system 100, all of which or a portion of which can be suitable for (i) implementing part or all of one or more embodiments of the techniques, methods, and systems and/or (ii) implementing and/or operating part or all of one or more embodiments non-transitory computer readable media described herein. As an example, a different or separate one of computer system 100 (and its internal components, or one or more elements of computer system 100) can be suitable for implementing part or all of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

When computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
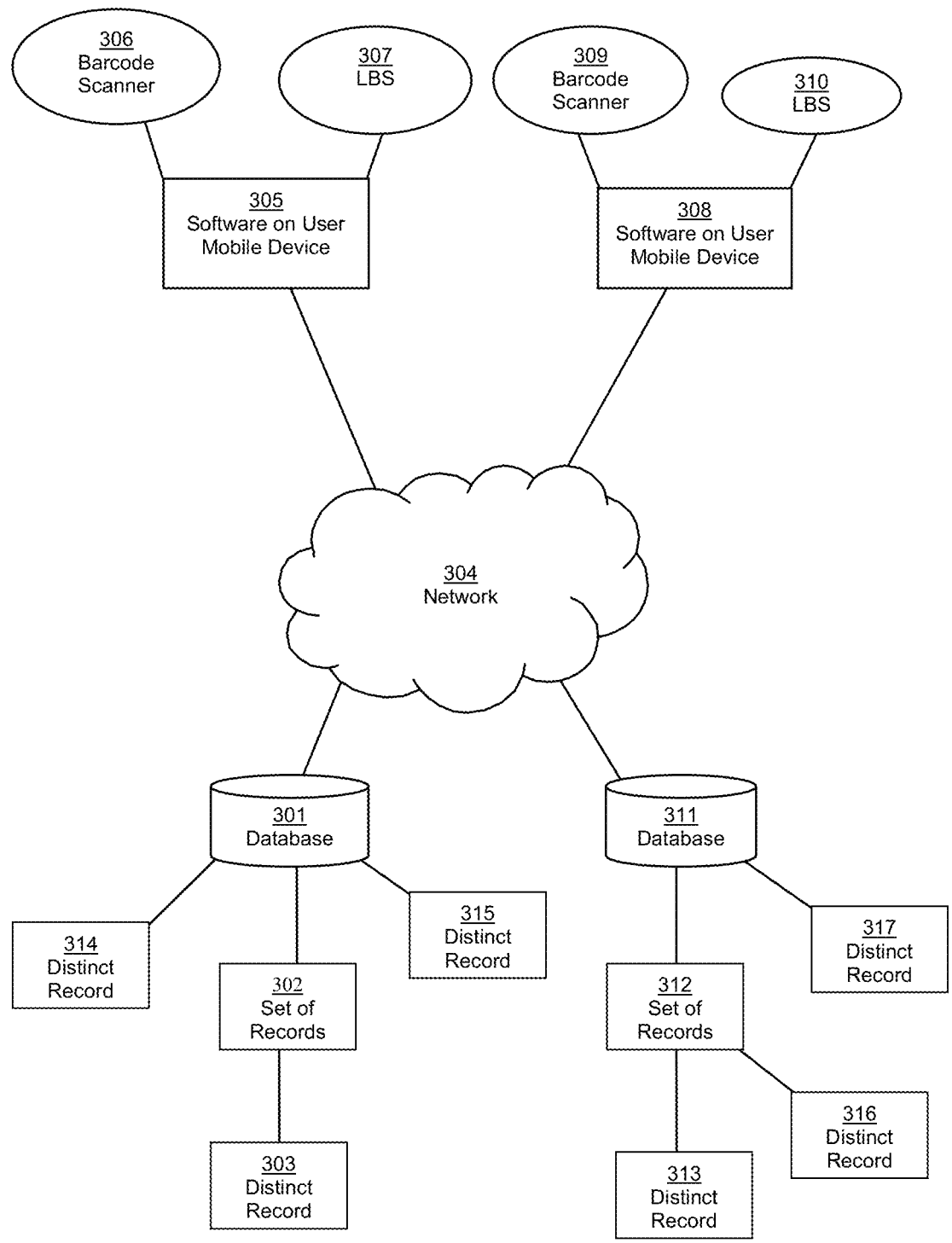
FIG. 3 illustrates a block diagram of an exemplary risk score system, according to an embodiment.

Turning ahead in the drawings, FIG. 3 illustrates a block diagram of an exemplary embodiment of the disclosed fraud prevention system 300. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, databases 301, 311 can each comprise sets of records 302, 312, respectively, which in turn can comprise a distinct record 303 (for set of records 302) or more than one distinct record 313, 316 (for set of records 312). In some embodiments, databases 301, 311 can comprise a distinct record 317 (for database 311) or more than one distinct record 314, 315 (for database 301). In some embodiments, databases 301, 311 can be accessed or queried through network 304.

Network 304 can be implemented using any suitable manner of wired and/or wireless communication, and can include the Internet and/or an intranet. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Databases 301, 311 can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Further, in some embodiments, network 304 can allow software 305, 308 to access or query databases 301, 311. In some embodiments, software 305, 308 can each comprise barcode scanner modules 306, 309, respectively, or location-based services (LBS) modules 307, 310, respectively. In some embodiments, LBS 307, 310 can comprise any type of location-based service module such as, for example, global positioning (GPS), Wi-Fi positioning (WiFi), a radio frequency identification (RFID), near field communication (NFC), Bluetooth beacons, ultra-wide band (UWB) technology, infrared (IR) beacons, or other such location-based systems known heretofore or invented. In some embodiments, databases 301, 311 can be simultaneously or at separate times accessed or queried by more than one software 305, 308.

Software 305, 308 (and barcode scanner modules 306, 309 and LBS modules 307, 310) can be located on user mobile electronic devices. Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America.

Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

Figure 4:
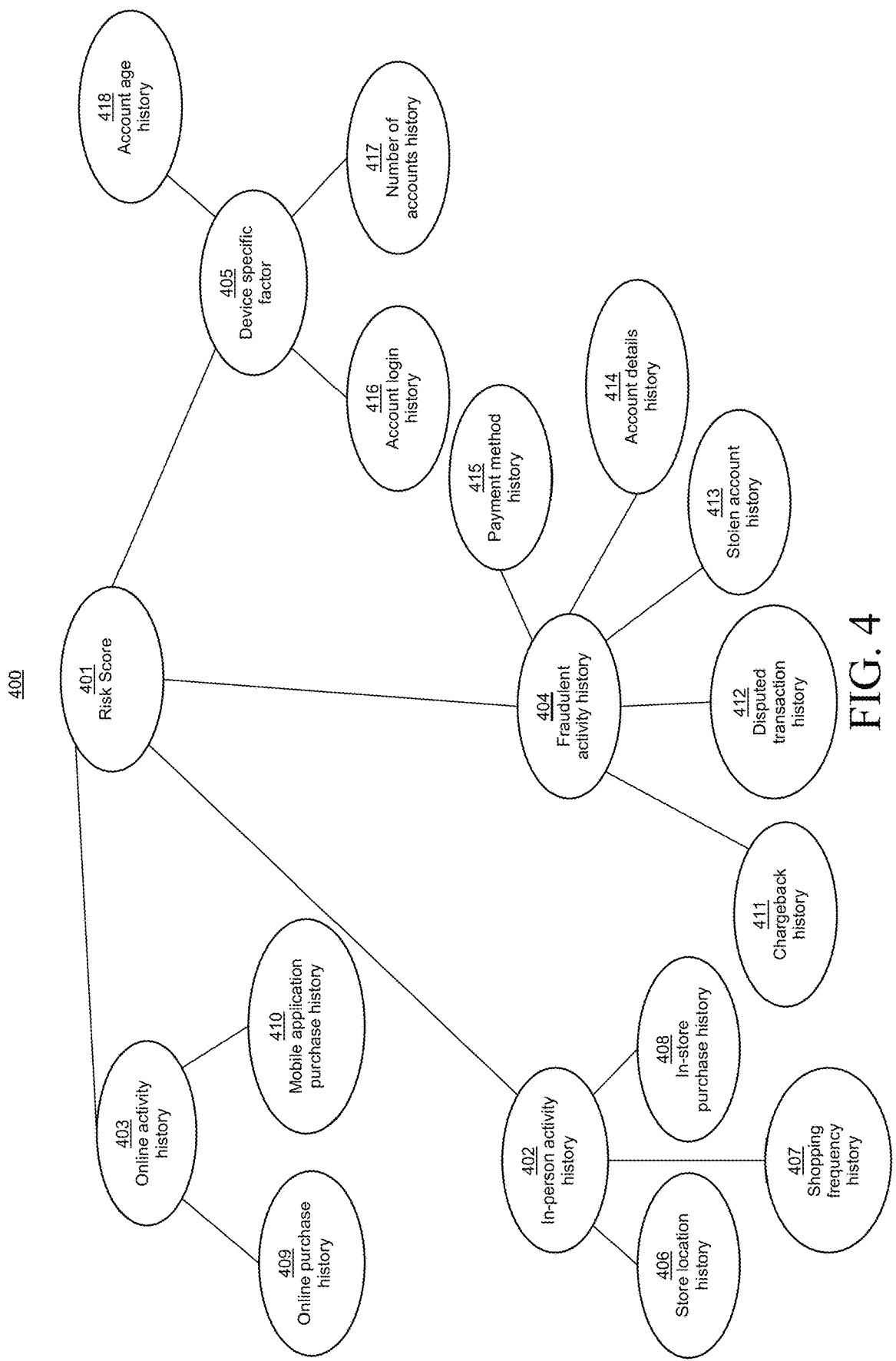
FIG. 4 illustrates a diagram of an exemplary risk score, according to an embodiment.

Turning now to FIG. 4, a block diagram 400 displaying an exemplary embodiment of a risk score 401 is shown. In some embodiments, a risk score 401 can comprise an in-person activity history 402. An in-person activity history 402 can generally comprise a set of records 302, 312 (FIG. 3) and/or one or more distinct records 303, 313, 314, 315, 316, 317 (FIG. 3) that describe at least one real world action completed on a user account. A set of records 302, 312 (FIG. 3) and/or one or more distinct records 303, 313, 314, 315, 316, 317 (FIG. 3) can describe at least one real world action completed on a user account when they contain information about the at least one real world action. In some embodiments, information about an at least one real world action can comprise transaction data or location data.

In some embodiments, the in-person activity history 402 comprises each of a store location history 406, a shopping frequency history 407, and an in-store purchase history 408. In other embodiments, an in-person activity history 402 comprises only one or two of these histories.

More specifically, in some embodiments, an in-person activity history 402 can comprise a store location history 406. A store location history 406 can generally comprise a set of records 302, 312 (FIG. 3) and/or one or more distinct records 303, 313, 314, 315, 316, 317 (FIG. 3) that describe one or more locations of a user account. A set of records 302, 312 (FIG. 3) and/or one or more distinct records 303, 313, 314, 315, 316, 317 (FIG. 3) can describe one or more locations of a user account when they contain information about where a user account has been. In some embodiments, one or more locations of a user account can comprise one or more locations where the user account has completed a transaction on a mobile device, one or more brick and mortar stores where the user account has completed transactions, one or more brick and mortar stores that the user account has been inside of and not completed a transaction, one or more brick and mortar stores that the user account has been nearby, a location of a user's home, and/or a location of a user's place of work. In some embodiments, information about where a user account has been can comprise data obtained from a LBS module 307, 310 (FIG. 3) and/or a barcode scanner module 306, 309 (FIG. 3).

In some embodiments, the in-person activity history 402 can comprise a shopping frequency history 407. A shopping frequency history 407 can generally comprise a set of records 302, 312 (FIG. 3) and/or one or more distinct records 303, 313, 314, 315, 316, 317 (FIG. 3) that describe a frequency with which a user account completes transactions and/or visits a specific brick and mortar store. A set of records 302, 312 (FIG. 3) and/or one or more distinct records 303, 313, 314, 315, 316, 317 (FIG. 3) can describe a frequency with which a user account completes transactions and/or visits a specific brick and mortar store when they contain information about a date, a time, or a rate at which a user account completes transactions and/or visits a specific brick and mortar store. In some embodiments, information about a date, time, or rate at which a user account completes transactions and/or visits a specific brick and mortar store can comprise a date of a transaction and/or visit, a time of a transaction and/or visit, a cost of a transaction, and/or a rate of transaction completion and/or store visits.

In some embodiments, an in-person activity history 402 can comprise an in-store purchase history 408. An in-store purchase history 408 can generally comprise a set of records 302, 312 (FIG. 3) and/or one or more distinct records 303, 313, 314, 315, 316, 317 (FIG. 3) that describe purchases made by a user account in a brick and mortar store. A set of records 302, 312 (FIG. 3) and/or one or more distinct records 303, 313, 314, 315, 316, 317 (FIG. 3) can describe purchases made by a user account in a brick and mortar store when they contain information about transactions completed by the user account in the brick and mortar store. In some embodiments, information about transactions completed by a user account in a brick and mortar store can comprise a cost of a transaction completed in a brick and mortar store, an identity of a product comprising a transaction completed in a brick and mortar store, a cost of a series of transactions completed in a brick and mortar store, a cost of a series of transactions completed in a series of brick and mortar stores, and/or an identity of a series of products comprising a series of transactions completed at a series of brick and mortar stores.

In some embodiments, the risk score 401 can comprise an online activity history 403. An online activity history 403 can generally comprise a set of records 302, 312 (FIG. 3) and/or one or more distinct records 303, 313, 314, 315, 316, 317 (FIG. 3) that describe at least one online action taken by the user account. A set of records 302, 312 (FIG. 3) and/or one or more distinct records 303, 313, 314, 315, 316, 317 (FIG. 3) can describe at least one online action taken by a user account when they contain information about the at least one online action. In some embodiments, information about an at least one online action can comprise transaction data or access data.

In some embodiments, an online activity history 403 comprises each of an online purchase history 409 and a mobile application purchase history 410. In other embodiments, the online activity history 403 comprises only one of these histories.

More specifically, in some embodiments, the online activity history 403 can comprise an online purchase history 409. The online purchase history 409 can generally comprise a set of records 302, 312 (FIG. 3) and/or one or more distinct records 303, 313, 314, 315, 316, 317 (FIG. 3) that describes a purchase made by the user account on an ecommerce website. A set of records 302, 312 (FIG. 3) and/or one or more distinct records 303, 313, 314, 315, 316, 317 (FIG. 3) can describe a purchase made on the e-commerce website when they contain information about the purchase. In some embodiments, information about a purchase made on an e-commerce website can comprise a cost of a transaction, an identity of a product comprising a transaction, a cost of a series of transactions, an identity of a series of products comprising a series of transactions, a date of a transaction, a time of a transaction, a cost of a transaction, and/or a rate of transaction completion.

In some embodiments, the online activity history 403 can comprise a mobile application history 410. A mobile application history 410 can generally comprise a set of records 302, 312 (FIG. 3) and/or one or more distinct records 303, 313, 314, 315, 316, 317 (FIG. 3) that describe a purchase made by a user account on a mobile application. A set of records 302, 312 (FIG. 3) and/or one or more distinct records 303, 313, 314, 315, 316, 317 (FIG. 3) can describe a purchase made on a mobile application when they contain information about the purchase. In some embodiments, information about a purchase made on a mobile application can comprise a cost of a transaction, an identity of a product comprising a transaction, a cost of a series of transactions, an identity of a series of products comprising a series of transactions, a date of a transaction, a time of a transaction, a cost of a transaction, and/or a rate of transaction completion.

In some embodiments, a risk score 401 can comprise a fraudulent activity history 404. A fraudulent activity history 404 can generally comprise a set of records 302, 312 (FIG. 3) and/or one or more distinct records 303, 313, 314, 315, 316, 317 (FIG. 3) that describe a history of potentially fraudulent actions taken by a user account. A set of records 302, 312 (FIG. 3) and/or one or more distinct records 303, 313, 314, 315, 316, 317 (FIG. 3) can describe a history of potentially fraudulent actions taken by a user account when they contain information about potentially fraudulent actions taken by the user account. In some embodiments, information about potentially fraudulent activities can comprise transaction data, account data, and payment method data.

In some embodiments, a fraudulent activity history 404 comprises each of a chargeback history 411, a disputed transaction history 412, a stolen account history 413, an account details history 414, and a payment method history 415. In other embodiments, the fraudulent activity history 404 comprises only one of these histories or less than all five of these histories.

More specifically, in some embodiments, a fraudulent activity history 404 can comprise a chargeback history 411. A chargeback history 411 can generally comprise a set of records 302, 312 (FIG. 3) and/or one or more distinct records 303, 313, 314, 315, 316, 317 (FIG. 3) that describe transactions where the user account has initiated a chargeback while using a credit and/or debit card. In various embodiments, a credit and/or debit card can comprise a gift card and/or a prepaid card. A set of records 302, 312 (FIG. 3) and/or one or more distinct records 303, 313, 314, 315, 316, 317 (FIG. 3) can describe transactions where a user account has initiated a chargeback when they contain information about a purchase and/or transaction that was subject to a chargeback. In some embodiments, information about a purchase and/or transaction that was subject to a chargeback can comprise transaction data, date data, and/or time data.

In some embodiments, a fraudulent activity history 404 can comprise a disputed transaction history 412. A disputed transaction history 412 can generally comprise a set of records 302, 312 (FIG. 3) and/or one or more distinct records 303, 313, 314, 315, 316, 317 (FIG. 3) that describe transactions disputed by a user account. A set of records 302, 312 (FIG. 3) and/or one or more distinct records 303, 313, 314, 315, 316, 317 (FIG. 3) can describe a disputed transaction when they contain information about a transaction that was disputed by a user account. In some embodiments, information about a disputed transaction can comprise transaction data, date data, or time data.

In some embodiments, a fraudulent activity history 404 can comprise a stolen account history 413. A stolen account history 413 can generally comprise a set of records 302, 312 (FIG. 3) and/or one or more distinct records 303, 313, 314, 315, 316, 317 (FIG. 3) that describe instances when a user account was stolen. A set of records 302, 312 (FIG. 3) and/or one or more distinct records 303, 313, 314, 315, 316, 317 (FIG. 3) can describe an instance when a user account was stolen when they contain information about the instance when the account was stolen. In some embodiments, information about an instance when a user account was stolen can comprise date data, time data, transaction data, and/or a written description.

In some embodiments, a fraudulent activity history 404 can comprise an account details history 414. An account details history 414 can generally comprise a set of records 302, 312 (FIG. 3) and/or one or more distinct records 303, 313, 314, 315, 316, 317 (FIG. 3) that describe changes made to a user account's details and/or profile information. A set of records 302, 312 (FIG. 3) and/or one or more distinct records 303, 313, 314, 315, 316, 317 (FIG. 3) can describe changes made to a user account's details and/or profile information when they contain information about instances when the account details and/or profile information were changed and/or altered. In some embodiments, instances when account details or profile information were changed and/or altered can comprise a change log, date data, time data, address data, birthday data, name data, email data, password data, pharmacy data, and/or account name data.

In some embodiments, a fraudulent activity history 404 can comprise a payment method history 415. A payment method history 415 can generally comprise a set of records 302, 312 (FIG. 3) and/or one or more distinct records 303, 313, 314, 315, 316, 317 (FIG. 3) that describe payment methods used with a user account. A set of records 302, 312 (FIG. 3) and/or one or more distinct records 303, 313, 314, 315, 316, 317 (FIG. 3) can describe payment methods used with a user account when they describe one or more saved payment methods, one or more past payment methods, and/or one or more new payment methods.

In some embodiments, a risk score 401 can comprise a device-specific factor 405. A device-specific factor 405 can generally comprise a set of records 302, 312 (FIG. 3) and/or one or more distinct records 303, 313, 314, 315, 316, 317 (FIG. 3) that describe properties of a mobile device on which a user account is logged in. A set of records 302, 312 (FIG. 3) and/or one or more distinct records 303, 313, 314, 315, 316, 317 (FIG. 3) can describe properties of a mobile device on which a user account is logged in when they contain information about the mobile device. In some embodiments, information about a mobile device on which a user account is logged in can comprise a media access control (MAC) address, an internet protocol (IP) address, a mobile device name, a serial number, a Settings.Secure.ANDROID_ID (SSAID or Android ID), an identifierForAdvertising (IDFA), Unique Device Identifier (UDID), Open Unique Device Identifier (OpenUDID), Google Service Framework (GSFID KEY), SIM Card Serial Number, Subscriber ID (IMSI), and/or International Mobile Equipment Identity (IMEI) number.

In some embodiments, the device-specific factor 405 comprises each of account login history 416, number of accounts history 417, and account age history 418. In other embodiments, the device-specific factor 405 comprises only one or two of these histories.

More specifically, in some embodiments, a device specific-factor 405 can comprise an account login history 416. An account login history 416 can generally comprise a set of records 302, 312 (FIG. 3) and/or one or more distinct records 303, 313, 314, 315, 316, 317 (FIG. 3) that describe mobile devices that an account has historically been logged into. A set of records 302, 312 (FIG. 3) and/or one or more distinct records 303, 313, 314, 315, 316, 317 (FIG. 3) can describe mobile devices that the account has historically been logged into when they contain information about the mobile devices that the account has been logged in on. In some embodiments, information about mobile devices that an account has been logged in on can comprise a media access control (MAC) address, an internet protocol (IP) address, a mobile device name, a serial number, a Settings.Secure.ANDROI-D_ID (SSAID or Android ID), an identifierForAdvertising (IDFA), Unique Device Identifier (UDID), Open Unique Device Identifier (OpenUDID), Google Service Framework (GSFID KEY), SIM Card Serial Number, Subscriber ID (IMSI), and/or International Mobile Equipment Identity (IMEI) number.

In some embodiments, a device-specific factor 405 can comprise a number of accounts history 417. A number of accounts history 417 can generally comprise a set of records 302, 312 (FIG. 3) and/or one or more distinct records 303, 313, 314, 315, 316, 317 (FIG. 3) that describe a number and/or a unique identifier of accounts logged into a mobile device. A set of records 302, 312 (FIG. 3) and/or one or more distinct records 303, 313, 314, 315, 316, 317 (FIG. 3) can describe a number and/or the unique identifier of accounts logged into a mobile device when they contain information about a number and/or unique identifier of the accounts. Information about a number and/or unique identifier of accounts can comprise a number of accounts datum, one or more account names, one or more account numbers, and/or one or more email addresses.

In many embodiments, a device specific factor can comprise an account age history 418. An account age history 418 can generally comprise a set of records 302, 312 (FIG. 3) and/or one or more distinct records 303, 313, 314, 315, 316, 317 (FIG. 3) that describe an age of an account. A set of records 302, 312 (FIG. 3) and/or one or more distinct records 303, 313, 314, 315, 316, 317 (FIG. 3) can describe an age of an account when they contain information about a date and/or a time the account was created, and/or a date and/or time the account was logged into a mobile device.

Figure 5:
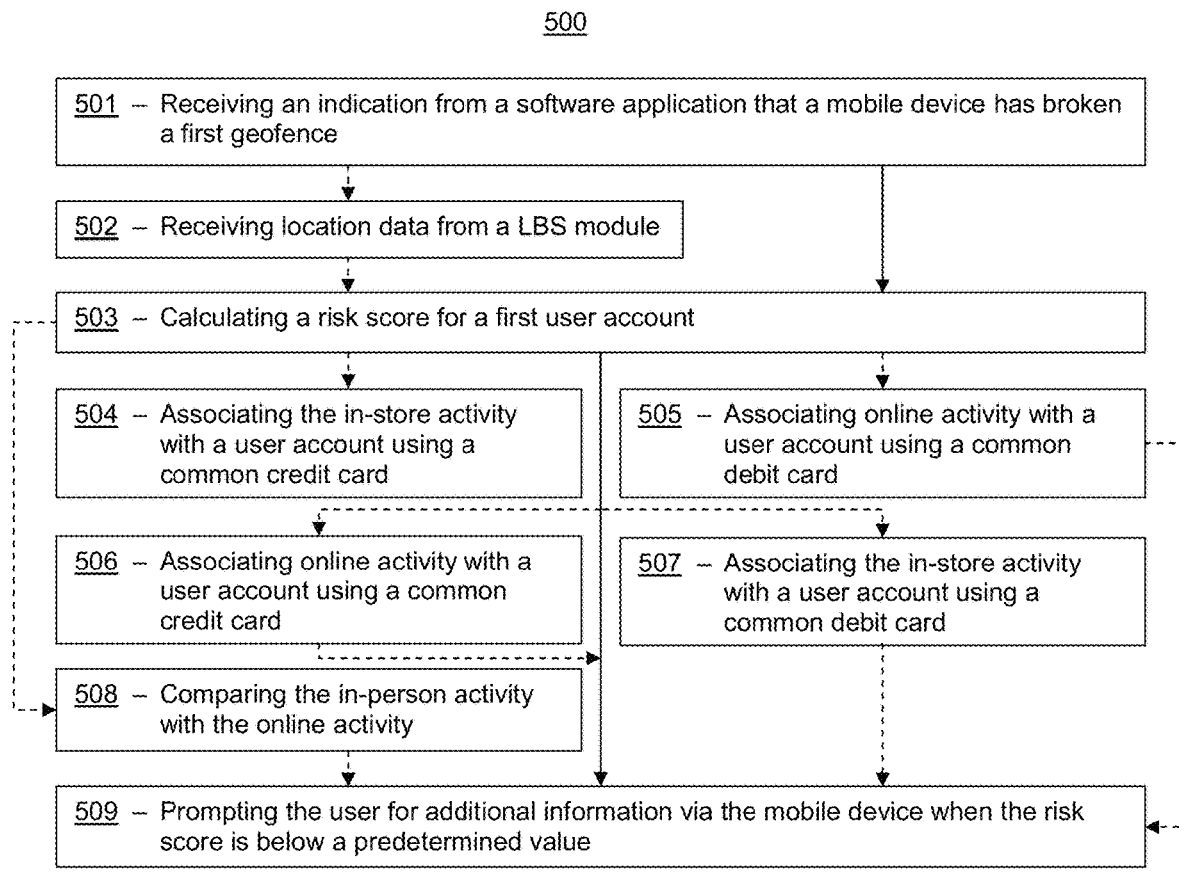
FIG. 5 illustrates a flowchart for an exemplary method, according to an embodiment.

Turning now to FIG. 5, an exemplary flowchart 500 of an embodiment of the disclosed system and/or method is shown. Flowchart 500 is merely exemplary and is not limited to the embodiments presented herein. Flowchart 500 can be employed in many different embodiments or examples not specifically depicted or described herein. In some embodiments, the activities or blocks of flowchart 500 can be performed in the order presented. In other embodiments, the activities of flowchart 500 can be performed in any suitable order. In still other embodiments, one or more of the activities of flowchart 500 can be combined or skipped. In many embodiments, system 300 (FIG. 3) can be suitable to perform flowchart 500 and/or one or more of the activities or blocks of flowchart 500. In these or other embodiments, one or more of the activities or blocks of flowchart 500 can be implemented as one or more computer instructions configured to run at one or more processing modules and configured to be stored at one or more non-transitory memory storage module. Such non-transitory memory storage modules can be part of a computer system, as described above. The processing module(s) can be similar or identical to the processing module(s) described above with respect to computer system 100 (FIG. 1) and computer system 200 (FIG. 2).

In some embodiments, flowchart 500 and other blocks in flowchart 500 can include using a distributed network including distributed memory architecture to perform the associated activity. This distributed architecture can reduce the impact on the network and system resources to reduce congestion in bottlenecks while still allowing data to be accessible from a central location.

In some embodiments, the system and/or method can comprise block 501 for receiving an indication from a software application that a mobile device has broken a first geofence. In some embodiments, an indication from a software application may comprise a signal sent to a server notifying the server that a mobile device has broken a geofence. In some embodiments, a geofence can comprise a virtual perimeter for a real-world geographic area. In various embodiments, breaking a geofence can comprise crossing a virtual perimeter and entering a real-world geographic area. In the same or different embodiments, a geofence can comprise a perimeter of a building. In some embodiments, a building surrounded by a geofence can comprise a brick and mortar retail store. In further embodiments, a geofence can comprise a perimeter of a section of a building and/or brick and mortar store.

In some embodiments, the system and/or method can comprise an optional block 502 for receiving location data from a LBS module 307, 310 (FIG. 3) before, after or concurrently with block 501. Data obtained from a LBS module 307, 310 (FIG. 3) can comprise a physical description, one or more images, one or more addresses, one or more GPS coordinates, one or more values associated with a geographic coordinate system, one or more computer aided design (CAD) files, location data obtained from Wi-Fi positioning module, location data obtained from a radio frequency identification module, location data obtained from near field communication module, location data obtained from Bluetooth beacons, location data obtained from an ultra-wide band (UWB) module, and/or location data obtained from infrared (IR) beacons. Set of records 302, 312 (FIG. 3) and/or one or more distinct records 314, 315, 316, 317 (FIG. 3) can comprise such data.

In some embodiments, the system and/or method can comprise block 503 for calculating a risk score 400 (FIG. 4). In some embodiments, block 503 can occur after either block 501 or block 502 (if block 502 is performed). a risk score may go up, down, and/or be unaffected by specifics of in-person activity history 402 (FIG. 4), online account history 403 (FIG. 4), fraudulent activity history 404 (FIG. 4), device specific factor 405 (FIG. 4), store location history 406 (FIG. 4), shopping frequency history 407 (FIG. 4), in-store purchase history 408 (FIG. 4), online purchase history 409 (FIG. 4), mobile application history 410 (FIG. 4), chargeback history 411 (FIG. 4), disputed transaction history 412 (FIG. 4), stolen account history 413 (FIG. 4), account details history 414 (FIG. 4), payment history 415 (FIG. 4), account login history 416 (FIG. 4), number of accounts history 417 (FIG. 4), and/or account age history 418 (FIG. 4). For purposes of this explanation, a decreased risk score indicates a lower fraud risk, and an increased risk score indicates a higher fraud risk. It should be understood that in some embodiments, this relationship can be reversed. In other words, in some embodiments, an increased risk score indicates a lower fraud risk, and a decreased risk score indicates a high fraud risk.

Generally speaking, a risk score 401 (FIG. 4) can decrease correspondingly with a number of times a user account has completed transactions and/or been present within a geofence, and can increase correspondingly when the user account has completed fewer transactions within the geofence, has completed no transactions within the geofence, has not often been present within the geofence, and/or has never been present within the geofence.

In some embodiments, a risk score 401 (FIG. 4) can increase when a store location history 406 (FIG. 4) shows that a user account has never completed transactions and/or been present within the geofence of a particular brick and mortar retail store. In other embodiments, a risk score 401 (FIG. 4) can increase when a store location history 406 (FIG. 4) shows that a user account has completed transactions and/or been present within a geofence of a particular brick and mortar retail store only once before. In still other embodiments, a risk score 401 (FIG. 4) can decrease when a store location history 406 (FIG. 4) shows that all transactions for a user account have been completed within a geofence and/or that a user account is often present in a geofence. In some embodiments, a risk score 401 (FIG. 4) can decrease when a store location history 406 (FIG. 4) shows that a majority of transactions for a user account have been completed within a geofence. In further embodiments, a risk score 401 (FIG. 4) can decrease when a store location history 406 (FIG. 4) shows that a plurality of transactions for a user account have been completed within a geofence.

In many embodiments, a store location history 406 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a store location history 406 (FIG. 4) cannot surpass. For example, a store location history 406 (FIG. 4) measured using a sliding scale, can comprise a linear relationship with a ceiling of 10 and a floor of 0. In this embodiment, an account that has been within a geofence ten times can score a 0, an account that has never been within a geofence can score a 10, and accounts that have been within a geofence between ten and zero times can be scored between 10 and 0 using a sliding linear scale (e.g., an account that has been within a geofence twice can score a 9, an account that has been within a geofence three times can score an 8, an account that has been within a geofence four times can score a 7, etc.). In embodiments where a store location history 406 (FIG. 4) is measured using distinct buckets, a score of a store location history 406 (FIG. 4) can be determined based on ranges. For example, a store location history 406 (FIG. 4) can score a 10 when a user account has been within a geofence zero to five times, and can score a 0 when a user account has been within a geofence more than five times.

In some embodiments, a risk score 401 (FIG. 4) can increase when a shopping frequency history 407 (FIG. 4) shows that a user account is visiting stores more frequently than previously recorded, is making purchases more frequently that previously recorded, and/or has recently made purchases within a different geofence. For example, if a user account made a purchase of televisions within one geofence for a first brick and mortar retail store, and then attempted to make a second purchase of televisions within a second geofence for a different brick and mortar retail store during the same day, a risk score 401 (FIG. 4) would increase. In other embodiments, a risk score 401 (FIG. 4) is unaffected when a shopping frequency history 407 (FIG. 4) shows that a user account is visiting stores less frequently than previously recorded, is visiting stores with a same frequency as previously recorded, is making purchases less frequently than previously recorded, is making purchases with a same frequency as previously recorded, and/or a sufficient time has passed between purchases within the same or different geofence. For example, if a user account made a purchase of televisions within one geofence for a first brick and mortar retail store, and then attempted to make a second purchase of televisions within a second geofence for a different brick and mortar retail store during the next month, a risk score 401 (FIG. 4) might be unaffected and/or decrease.

In many embodiments, a shopping frequency history 407 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a shopping frequency history 407 (FIG. 4) cannot surpass. For example, a shopping frequency history 407 (FIG. 4) measured using a sliding scale, can comprise a linear relationship with a ceiling of 10 and a floor of 0. In this embodiment, an account that historically has made one purchase every ten days and is still making purchases every ten days can score a 0, an account that historically has made one purchase every ten days and is currently making one purchase every day can score a 10, and accounts that historically have made one purchase every ten days and are currently making one purchase between every day and every ten days can be scored between 10 and 0 using a sliding linear scale (e.g., an account currently making one purchase every two days can score a 9, an account currently making one purchase every three days can score an 8, an account currently making one purchase every four days can score a 7, etc.). In embodiments where a shopping frequency history 407 (FIG. 4) is measured using distinct buckets, a score of a shopping frequency history 407 (FIG. 4) can be determined based on ranges. For example, a shopping frequency history 407 (FIG. 4) can score a 10 when an account that historically has made one purchase every ten days is currently making purchases between every one to five days, and can score a 0 when currently making purchases every six to ten days.

In some embodiments, a risk score 401 (FIG. 4) can increase when an in-store purchase history 408 (FIG. 4) shows that a user account has recently purchased products that are incongruous with a user account's past purchase history in a brick and mortar store and/or has increased an amount spent in a brick and mortar store as compared with a user account's past purchase history. For example, in one embodiment, if a user account has consistently purchased only grocery products in brick and mortar stores, but has now recently purchased a television in a brick and mortar store, then a risk score 401 (FIG. 4) can increase. In other embodiments, a risk score 401 (FIG. 4) can be unaffected by a user account purchasing products that are congruous with its purchase history in brick and mortar stores and/or spending approximately a same amount in brick and mortar stores as compared with a user account's past purchase history. For example, in one embodiment, if a user account typically purchases only grocery products in brick and mortar stores, but once a month purchases school supplies in brick and mortar stores, then a risk score 401 (FIG. 4) would not be affected by purchasing school supplies in a brick and mortar store.

In many embodiments, an in-store purchase history 408 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that an in-store purchase history 408 (FIG. 4) cannot surpass. For example, an in-store purchase history 408 (FIG. 4) measured using a sliding scale, can comprise a linear relationship with a ceiling of 10 and a floor of 0. In this embodiment, an account that has made only congruous purchases over a specific amount of time can score a 0, an account that has made a purchase of ten incongruous items over a specific amount of time can score a 10, and accounts that have made purchases of between ten and zero incongruous items over a specific amount of time can be scored between 10 and 0 using a sliding linear scale (e.g., an account that has made purchases of nine incongruous items over a specific amount of time can score a 9, an account that has made purchases of eight incongruous items over a specific amount of time can score an 8, an account that has made purchases of seven incongruous items over a specific amount of time can score a 7, etc.). In embodiments where an in-store purchase history 408 (FIG. 4) is measured using distinct buckets, a score of an in-store purchase history 408 (FIG. 4) can be determined based on ranges. For example, an in-store purchase history 408 (FIG. 4) can score a 0 when a user account has purchased between zero and five incongruous items over a specific amount of time, and can score a 10 when a user account has purchased more than five incongruous items over the same specific amount of time.

In some embodiments, a risk score 401 (FIG. 4) can increase when an online purchase history 409 (FIG. 4) shows that the user account has recently purchased products that are incongruous with the user account's past purchase history on an internet and/or has increased an amount spent on an internet as compared with a user account's past purchase history. For example, if a user account has consistently purchased only books on the internet in the past, but also has recently purchased a television on the internet, then a risk score 401 (FIG. 4) would increase. In other embodiments, a risk score 401 (FIG. 4) is unaffected by a user account purchasing products that are congruous with its purchase history on the internet and/or spending approximately a same amount on an internet as compared with a user account's past purchase history. For example if, a user account typically purchased only books on the internet, but once a month purchased kitchen supplies on the internet, a risk score 401 (FIG. 4) would not be affected by purchasing kitchen supplies on the internet.

In many embodiments, an online purchase history 409 (FIG. 4) can be measured on a sliding scale and/or fall within distinct buckets. In many embodiments, an online purchase history 409 (FIG. 4) can be based upon a number of items and/or an amount spent on items. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that an online purchase history 409 (FIG. 4) cannot surpass.

For example, an online purchase history 409 (FIG. 4) measured using a sliding scale, can comprise a linear relationship with a ceiling of 10 and a floor of 0. As another example, an account that has made only congruous purchases over a specific amount of time can score a 0, an account that has made a purchase of ten incongruous items over a specific amount of time can score a 10, and accounts that have made purchases of between zero and ten incongruous items over a specific amount of time can be scored between 10 and 0 using a sliding linear scale (e.g., an account that has made purchases of nine incongruous items over a specific amount of time can score a 9, an account that has made purchases of eight incongruous items over a specific amount of time can score an 8, an account that has made purchases of seven incongruous items over a specific amount of time can score a 7, etc.). As another example, an account that has spent $0.00 on incongruous purchases over a specific amount of time can score a 0, an account that has that has spent $1,000.00 on incongruous items over a specific amount of time can score a 10, and accounts that have spent between $0.00 and $1,000.00 on incongruous items over a specific amount of time can be scored between 10 and 0 using a sliding linear scale (e.g., an account that has spent $900.00 on incongruous items over a specific amount of time can score a 9, an account that has spent $800.00 on incongruous items over a specific amount of time can score an 8, an account that has spent $700.00 on incongruous items over a specific amount of time can score a 7, etc.).

In embodiments where an online purchase history 409 (FIG. 4) is measured using distinct buckets, an online purchase history 409 (FIG. 4) can be determined based on ranges. For example, an online purchase history 409 (FIG. 4) can score a 0 when a user account has purchased between zero and five incongruous items over a specific amount of time, and can score a 10 when a user account has purchased five or more incongruous items over the same specific amount of time. As another example, an online purchase history 409 (FIG. 4) can score a 0 when a user account has spent between $0.00 and $500.00 on incongruous items over a specific amount of time, and can score a 10 when a user account has spent over $500.00 on incongruous items over the same specific amount of time.

In some embodiments, a risk score 401 (FIG. 4) can increase when a mobile application purchase history 410 (FIG. 4) shows that the user account has recently purchased products that are incongruous with the user account's past purchase history on a mobile application and/or has increased an amount spent on a mobile application as compared with a user account's past purchase history. For example, if a user account has consistently purchased only clothing on a mobile application in the past, but has also recently purchased a television on a mobile application, then a risk score 401 (FIG. 4) would increase. In other embodiments, a risk score 401 (FIG. 4) is unaffected by a user account purchasing products that are congruous with its purchase history on a mobile application and/or spending approximately a same amount on a mobile application as compared with a user account's past purchase history. For example, if a user account typically purchased only clothing on a mobile application, but once a month purchased books supplies on the mobile application, a risk score 401 (FIG. 4) would not be affected by purchasing book supplies on the mobile application.

In many embodiments, a mobile application purchase history 410 (FIG. 4) can be measured on a sliding scale and/or fall within distinct buckets. In many embodiments, a mobile application purchase history 410 (FIG. 4) can be based upon a number of items and/or an amount spent on items. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a mobile application purchase history 410 (FIG. 4) cannot surpass.

For example, a mobile application purchase history 410 (FIG. 4) measured using a sliding scale, can comprise a linear relationship with a ceiling of 10 and a floor of 0. As another example, an account that has made only congruous purchases over a specific amount of time can score a 0, an account that has made a purchase of ten incongruous items over a specific amount of time can score a 10, and accounts that have made purchases of between zero and ten incongruous items over a specific amount of time can be scored between 10 and 0 using a sliding linear scale (e.g., an account that has made purchases of nine incongruous items over a specific amount of time can score a 9, an account that has made purchases of eight incongruous items over a specific amount of time can score an 8, an account that has made purchases of seven incongruous items over a specific amount of time can score a 7, etc.). As another example, an account that has spent $0.00 on incongruous purchases over a specific amount of time can score a 0, an account that has that has spent $1,000.00 on incongruous items over a specific amount of time can score a 10, and accounts that have spent between $0.00 and $1,000.00 on incongruous items over a specific amount of time can be scored between 10 and 0 using a sliding linear scale (e.g., an account that has spent $900.00 on incongruous items over a specific amount of time can score a 9, an account that has spent $800.00 on incongruous items over a specific amount of time can score an 8, an account that has spent $700.00 on incongruous items over a specific amount of time can score a 7, etc.).

In embodiments where a mobile application purchase history 410 (FIG. 4) is measured using distinct buckets, a mobile application purchase history 410 (FIG. 4) can be determined based on ranges. For example, a mobile application purchase history 410 (FIG. 4) can score a 0 when a user account has purchased between zero and five incongruous items over a specific amount of time, and can score a 10 when a user account has purchased five or more incongruous items over the same specific amount of time. As another example, a mobile application purchase history 410 (FIG. 4) can score a 0 when a user account has spent between $0.00 and $500.00 on incongruous items over a specific amount of time, and can score a 10 when a user account has spent over $500.00 on incongruous items over the same specific amount of time.

In some embodiments, a risk score 401 (FIG. 4) can increase when a chargeback history 411 (FIG. 4) shows that a credit card and/or debit card chargeback has been initiated from the user account. In some embodiments, a risk score 401 (FIG. 4) can be unaffected (or could decrease in different embodiments) when the chargeback history 411 (FIG. 4) shows that a credit card and/or debit card chargeback has never been initiated from the user account.

In many embodiments, a chargeback history 411 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a chargeback history 411 (FIG. 4) cannot surpass. For example, a chargeback history 411 (FIG. 4) measured using a sliding scale, can comprise a linear relationship with a ceiling of 10 and a floor of 0. In this embodiment, an account that has had zero chargebacks can score a 0, an account that has had ten chargebacks can score a 10, and accounts that have had between ten and zero chargebacks can be scored between 10 and 0 using a sliding linear scale (e.g., an account that has had nine chargebacks can score a 9, an account that has had eight chargebacks can score an 8, an account that has had seven chargebacks can score a 7, etc.). In embodiments where a chargeback history 411 (FIG. 4) is measured using distinct buckets, a score of a chargeback history 411 (FIG. 4) can be determined based on ranges. For example, a chargeback history 411 (FIG. 4) can score a 10 when a user account has had more than five chargebacks, and can score a 0 when a user account has had five or fewer chargebacks.

In some embodiments, a risk score 401 (FIG. 4) can increase when a disputed transaction history 412 (FIG. 4) shows that a transaction and/or purchase has been disputed by the user account. In other embodiments, a risk score 401 (FIG. 4) can be unaffected (or could decrease in different embodiments) when the disputed transaction history 412 (FIG. 4) shows that a transaction and/or purchase has never been disputed by the user account.

In many embodiments, a disputed transaction history 412 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a disputed transaction history 412 (FIG. 4) cannot surpass. For example, a disputed transaction history 412 (FIG. 4) measured using a sliding scale, can comprise a linear relationship with a ceiling of 10 and a floor of 0. In this embodiment, an account that has had zero disputed transactions can score a 0, an account that has had ten disputed transactions can score a 10, and accounts that have had between ten and zero disputed transactions can be scored between 10 and 0 using a sliding linear scale (e.g., an account that has had nine disputed transactions can score a 9, an account that has had eight disputed transactions can score an 8, an account that has had seven disputed transactions can score a 7, etc.). In embodiments where a disputed transaction history 412 (FIG. 4) is measured using distinct buckets, a disputed transaction history 412 (FIG. 4) can be determined based on ranges. For example, a disputed transaction history 412 (FIG. 4) can score a 10 when a user account has had more than five disputed transactions, and can score a 0 when a user account has had five or fewer disputed transactions.

In some embodiments, a risk score 401 (FIG. 4) can increase when a stolen account history 413 (FIG. 4) shows that the user account has been stolen in the past. In other embodiments, a risk score 401 (FIG. 4) can be unaffected (or could decrease in different embodiments) when the stolen account history 413 (FIG. 4) shows that the user account has never been stolen.

In many embodiments, a stolen account history 413 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a stolen account history 413 (FIG. 4) cannot surpass. For example, a stolen account history 413 (FIG. 4) measured using a sliding scale, can comprise a linear relationship with a ceiling of 10 and a floor of 0. In this embodiment, an account that has been stolen zero times can score a 0, an account that has been stolen ten times can score a 10, and accounts that have been stolen between ten and zero times can be scored between 10 and zero using a sliding linear scale (e.g., an account that has been stolen nine can score a 9, an account that has been stolen eight times can score an 8, an account that has been stolen seven times can score a 7, etc.). In embodiments where a stolen account history 413 (FIG. 4) is measured using distinct buckets, a stolen account history 413 (FIG. 4) can be determined based on ranges. For example, a stolen account history 413 (FIG. 4) can score a 10 when a user account has been stolen between ten and five times, and can score a 0 when a user account has been stolen five or fewer times.

In some embodiments, a risk score 401 (FIG. 4) can increase when an account details history 414 (FIG. 4) shows that the details of the user account have been changed. For example, if a shipping address of the user account was changed, a risk score 401 (FIG. 4) would increase. In other embodiments, a risk score 401 (FIG. 4) would be unaffected if the account details history 414 (FIG. 4) shows that the details of the user account have not been changed. For example, if the password of the user account has never been changed, a risk score 401 (FIG. 4) would be unaffected (or could decrease in different embodiments).

In many embodiments, an account details history 414 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that an account details history 414 (FIG. 4) cannot surpass. For example, an account details history 414 (FIG. 4) measured using a sliding scale, can comprise a linear relationship with a ceiling of 10 and a floor of 0. In this embodiment, an account that has had no details changed within a specific time period can score a 0, an account that has had ten details changed within a specific time period can score a 10, and accounts that have had between ten and zero account details changed within a specific time period can be scored between 10 and 0 using a sliding linear scale (e.g., an account that has had nine account details changed within a specific time period can score a 9, an account that has had eight account details changed within a specific time period can score an 8, an account that has had seven account details changed within a specific time period can score a 7, etc.). In embodiments where an account details history 414 (FIG. 4) is measured using distinct buckets, a score of an account details history 414 (FIG. 4) can be determined based on ranges. For example, an account details history 414 (FIG. 4) can score a 10 when a user account has had more than five account details changed within a specific time period, and can score a 0 when a user account has had between five and zero account details changed within the same specific time period.

In some embodiments, a risk score 401 (FIG. 4) can increase when a payment method history 415 (FIG. 4) shows that the one or more payment methods associated with the user account have been changed. For example, if a new credit card has been associated with the user account, the risk score would increase. As a further example, if a credit card has recently been removed from the user account, a risk score 401 (FIG. 4) would increase. In other embodiments, a risk score 401 (FIG. 4) would be unaffected (or could decrease in different embodiments) if the payment method history 415 (FIG. 4) shows that a details of the user account have not been changed. For example, if the one or more payment methods associated with a user account have never been changed, a risk score 401 (FIG. 4) would be unaffected.

In many embodiments, a payment method history 415 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a payment method history 415 (FIG. 4) cannot surpass. For example, a payment method history 415 (FIG. 4) measured using a sliding scale, can comprise a linear relationship with a ceiling of 10 and a floor of 0. In this embodiment, an account that has not had a payment method added or removed within the past ten days can score a 0, an account that has had a payment method added or removed within the last day can score a 10, and accounts that have had payment methods added or removed between one day to ten days ago can be scored between 10 and 0 using a sliding linear scale (e.g., an account that has had a payment method added or removed between one and two days ago can score a 9, an account that has a payment method added or removed between two and three days ago can score an 8, an account that has had a payment method added or removed between three and four days ago can score a 7, etc.). In embodiments where a payment method history 415 (FIG. 4) is measured using distinct buckets, a score of a payment method history 415 (FIG. 4) can be determined based on ranges. For example, a payment method history 415 (FIG. 4) can score a 10 when a user account has added or removed a payment method within the past five days, and can score a 0 when a user account has added or removed a payment method more than five days ago.

In some embodiments, a risk score 401 (FIG. 4) can increase when an account login history 416 (FIG. 4) shows that the user account has been logged into a software application on a different electronic device in the past. In some embodiments, a risk score 401 (FIG. 4) can be unaffected (or could decrease in different embodiments) when the account login history 416 (FIG. 4) shows that the user account has not been logged into a software application on a different electronic device in the past.

In many embodiments, an account login history 416 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that an account login history 416 (FIG. 4) cannot surpass. For example, an account login history 416 (FIG. 4) measured using a sliding scale, can comprise a linear relationship with a ceiling of 10 and a floor of 1. In this embodiment, an account that has been logged into only one electronic device within a specific period of time can score a 1, an account that has been logged into 10 electronic devices within a specific period of time can score a 10, and accounts that have been logged into between ten devices and one device can be scored between 10 and 1 using a sliding linear scale (e.g., an account that has been logged into nine electronic devices can score a 9, an account that has been logged into eight electronic devices can score an 8, an account that has been logged into seven electronic devices can score a 7, etc.). In embodiments where an account login history 416 (FIG. 4) is measured using distinct buckets, a score of an account login history 416 (FIG. 4) can be determined based on ranges. For example, an account login history 416 (FIG. 4) can score a 10 when a user account has been logged into six or more electronic devices within a specific period of time, and can score a 1 when a user account has been logged into five or fewer electronic devices within the same time period.

In some embodiments, a risk score 401 (FIG. 4) can increase when a number of accounts history 417 (FIG. 4) shows that an electronic device currently and/or in the past has had a plurality of user accounts logged into a software application on the electronic device. For example, if a number of accounts history 417 (FIG. 4) shows that two accounts have previously been logged into a software application on an electronic device, then a risk score 401 (FIG. 4) would increase. As a further example, if a number of accounts history 417 (FIG. 4) shows that another user account is currently logged into a software application on the same electronic device, then a risk score 401 (FIG. 4) would increase. In some embodiments, a risk score 401 (FIG. 4) can be unaffected (or could decrease in different embodiments) when the number of accounts history 417 (FIG. 4) shows that no other user accounts have been and/or are currently logged into a software application on an electronic device.

In many embodiments, a number of accounts history 417 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a number of accounts history 417 (FIG. 4) cannot surpass. For example, a number of accounts history 417 (FIG. 4) measured using a sliding scale, can comprise a linear relationship with a ceiling of 10 and a floor of 0. In this embodiment, an account that has no other accounts concurrently logged into an electronic device can score a 0, an account that has ten other accounts concurrently logged into an electronic device can score a 10, and an account that have between ten and zero other accounts concurrently logged into an electronic device can be scored between 10 and 0 using a sliding linear scale (e.g., an account that has nine other accounts concurrently logged into an electronic device can score a 9, an account that has eight other accounts concurrently logged into an electronic device can score an 8, an account that has seven other accounts concurrently logged into an electronic device can score a 7, etc.). In embodiments where a number of accounts history 417 (FIG. 4) is measured using distinct buckets, a score of a number of accounts history 417 (FIG. 4) can be determined based on ranges. For example, a number of accounts history 417 (FIG. 4) can score a 10 when an account has six or more other accounts concurrently logged into an electronic device, and can score a 0 when an account has five or fewer accounts concurrently logged into the electronic device.

In some embodiments, a risk score 401 (FIG. 4) can increase when an account age history 418 (FIG. 4) shows that an account was created recently. For example, a risk score 401 (FIG. 4) can increase when an account was created less than week ago. In various embodiments, a risk score 401 (FIG. 4) can decrease when an account has not been created recently. For example, a risk score 401 (FIG. 4) can increase when an account was created greater than one week ago. In the same or different embodiments, a risk score 401 (FIG. 4) can be unaffected when an account age history 418 (FIG. 4) shows that an account was created at a specific time. For example, a risk score 401 (FIG. 4) can be unaffected when an account was created one week ago. In some embodiments, a risk score 401 (FIG. 4) can increase when an account age history 418 (FIG. 4) shows that an account has been logged into a mobile device for a short amount of time. For example, a risk score 401 (FIG. 4) can increase when an account has been logged into a mobile device for less than a week. In various embodiments, a risk score 401 (FIG. 4) can decrease when an account has been logged into a mobile device for a longer amount of time. For example, a risk score 401 (FIG. 4) can increase when an account has been logged into a mobile device for more than a week. In the same or different embodiments, a risk score 401 (FIG. 4) can be unaffected when an account age history 418 (FIG. 4) shows that has been logged into a mobile device for a specific amount of time. For example, a risk score 401 (FIG. 4) can be unaffected when an account has been logged into a mobile device for one week.

In many embodiments, an account age history 418 (FIG. 4) can be measured on a sliding scale and/or fall within distinct buckets. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that an account age history 418 (FIG. 4) cannot surpass. For example, an account age history 418 (FIG. 4) measured using a sliding scale, can comprise a linear relationship with a ceiling of 10 and a floor of 0. In this embodiment, an account that is over ten days old can score a 0, an account that is a day or less old can score a 10, and accounts that are between a day and ten days old can be scored between 10 and 0 using a sliding linear scale (e.g., that is between one and two days old can score a 9, an account that is between two and three days old can score an 8, an account that is between three and four days old can score a 7, etc.). In embodiments where an account age history 418 (FIG. 4) is measured using distinct buckets, a score of an account age history 418 (FIG. 4) can be determined based on ranges. For example, an account age history 418 (FIG. 4) can score a 10 when an account is five days old or younger, and can score a 0 when an account is six days old or older.

In many embodiments, block 503 for calculating a risk score 400 (FIG. 4) can further comprise applying a weight to in-person activity history 402 (FIG. 4), online account history 403 (FIG. 4), fraudulent activity history 404 (FIG. 4), device specific factor 405 (FIG. 4), store location history 406 (FIG. 4), shopping frequency history 407 (FIG. 4), in-store purchase history 408 (FIG. 4), online purchase history 409 (FIG. 4), mobile application history 410 (FIG. 4), chargeback history 411 (FIG. 4), disputed transaction history 412 (FIG. 4), stolen account history 413 (FIG. 4), account details history 414 (FIG. 4), payment history 415 (FIG. 4), account login history 416 (FIG. 4), number of accounts history 417 (FIG. 4), and/or account age history 418 (FIG. 4) to create a weighted score. In the same or different embodiments, a weight as applied can increase or decrease in-person activity history 402 (FIG. 4), online account history 403 (FIG. 4), fraudulent activity history 404 (FIG. 4), device specific factor 405 (FIG. 4), store location history 406 (FIG. 4), shopping frequency history 407 (FIG. 4), in-store purchase history 408 (FIG. 4), online purchase history 409 (FIG. 4), mobile application history 410 (FIG. 4), chargeback history 411 (FIG. 4), disputed transaction history 412 (FIG. 4), stolen account history 413 (FIG. 4), account details history 414 (FIG. 4), payment history 415 (FIG. 4), account login history 416 (FIG. 4), number of accounts history 417 (FIG. 4), and/or account age history 418 (FIG. 4) by a specified factor by multiplying, dividing, adding to, and/or subtracting from an element of a risk score). In the same or different embodiments, a weight can be set by an administrator on a per geofence (e.g., per store or per building) basis. In this way, a risk score 401 (FIG. 4) can be tailored to a specific location, and each location can choose which elements of a risk score 401 (FIG. 4) matter most in the overall calculation. In many embodiments, one or more weighted scores for each element of a risk score can be summed to calculate a risk score 400 (FIG. 4). In some embodiments, a risk score 400 (FIG. 4) can be referred to as a total risk score.

Generally speaking, user payment information and user account information for both online and in-store purchases can be contained on one or more servers owned and/or operated by a retailer. The retailer can then cross reference this information to associate a payment method with a user account and a purchase history. For example, if a user purchases bagels in-store using a credit card, and then later uses a same credit card to purchase office supplies online, a retailer can associate these two purchases with an account of the user. Thus, in some embodiments, a system and/or method in FIG. 5 can comprise block 504 for associating an in-store activity with a user account using a common credit card. In some embodiments, block 504 can occur after block 503. In other embodiments, block 504 can occur concurrently and/or before block 503. In other embodiments, a system and/or method can comprise block 505 for associating an online activity with a user account using a common debit card. In some embodiments, block 505 can occur after block 503. In other embodiments, block 505 can occur concurrently and/or before block 503. In further embodiments, a system and/or method can comprise block 506 for associating an online activity with a user account using a common credit card. In some embodiments, block 506 can occur after block 503. In other embodiments, block 506 can occur concurrently and/or before block 503. In some further embodiments, a system and/or method can comprise block 507 for associating an in-store activity with a user account using a common debit card. In some embodiments, block 507 can occur after block 503. In other embodiments, block 507 can occur concurrently and/or before block 503.

In some embodiments, a system and/or method can comprise block 508 comparing an in-store or in-person activity with an online activity. In some embodiments, block 508 can occur immediately after and/or concurrently with blocks 503, 504, 505, 506, and/or 507 if they are present. In some embodiments, a risk score 401 (FIG. 4) is increased when differences between an in-person activity history 402 (FIG.

4) and an online activity history 403 (FIG. 4) are detected. For example, if an in-person activity history shows that a user account exclusively purchases groceries, and an online activity history shows that only power tools are purchased, then a risk score 401 (FIG. 4) would be increased. As another example, if the online activity history shows that the user account exclusively purchases power tools, and the in-person activity history shows that the user account purchases hardware for use with power tools, then a risk score 401 (FIG. 4) would remain unaffected (or could decrease in different embodiments).

In many embodiments, a comparison between an in-store activity and an online activity can be measured on a sliding scale and/or fall within distinct buckets. In many embodiments, a comparison between an in-store activity and an online activity can be based upon a number of items and/or an amount spent on items. In embodiments where a sliding scale is used, the sliding scale can comprise a mathematical relationship. In some embodiments, a mathematical relationship can comprise a linear relationship, a logarithmic relationship, an exponential relationship, a hyperbolic relationship, and/or other types of mathematical relationship known in the art. In the same or different embodiments, a sliding scale can comprise a ceiling or floor that a comparison between an in-store activity and an online activity cannot surpass.

For example, a comparison between an in-store activity and an online activity measured using a sliding scale can comprise a linear relationship with a ceiling of 10 and a floor of 0. As another example, an account where in-store purchases and online purchases are completely congruous over a specific amount of time can score a 0, an account where a comparison between in-store purchases and online purchases shows ten incongruous items over a specific amount of time can score a 10, and accounts where a comparison between in-store purchases and online purchases shows between zero and ten incongruous items over a specific amount of time can be scored between 10 and 0 using a sliding linear scale (e.g., an account where a comparison between in-store purchases and online purchases shows nine incongruous items over a specific amount of time can score a 9, an account where a comparison between in-store purchases and online purchases shows eight incongruous items over a specific amount of time can score an 8, an account where a comparison between in-store purchases and online purchases shows seven incongruous items over a specific amount of time can score a 7, etc.). As another example, an account where a comparison between in-store purchases and online purchases shows $0.00 spent on incongruous purchases over a specific amount of time can score a 0, an account where a comparison between in-store purchases and online purchases shows $1,000.00 spent on incongruous items over a specific amount of time can score a 10, and accounts where a comparison between in-store purchases and online purchases shows between $0.00 and $1,000.00 spent on incongruous items over a specific amount of time can be scored between 10 and 0 using a sliding linear scale (e.g., an account that has spent $900.00 on incongruous items over a specific amount of time can score a 9, an account that has spent $800.00 on incongruous items over a specific amount of time can score an 8, an account that has spent $700.00 on incongruous items over a specific amount of time can score a 7, etc.).

In embodiments where a comparison between an in-store activity and an online activity is measured using distinct buckets, a comparison between an in-store activity and an online activity can be determined based on ranges. For example, a comparison between an in-store activity and an online activity can score a 0 when an account where a comparison between in-store purchases and online purchases shows between zero and five incongruous items over a specific amount of time, and can score a 10 when a comparison between in-store purchases and online purchases for an account shows five or more incongruous items over the same specific amount of time. As another example, a comparison between an in-store activity and an online activity can score a 0 when a comparison between in-store purchases and online purchases shows between $0.00 and $500.00 spent on incongruous items over a specific amount of time, and can score a 10 when a comparison between in-store purchases and online purchases shows greater than $500.00 spent on incongruous items over the same specific amount of time.

In some embodiments, a system and/or method can comprise block 509 for prompting a user for additional information via a mobile device when a risk score 401 (FIG. 4) is below and/or above a predetermined value. In many embodiments, a predetermined value can be set by an administrator of system 300 (FIG. 3) and/or a manager of a geofence. In some embodiments, each of blocks 504-508 are performed before block 509. In other embodiments, at least one of blocks 504-508 is not performed as part of the system and/or method.

Figure 6:
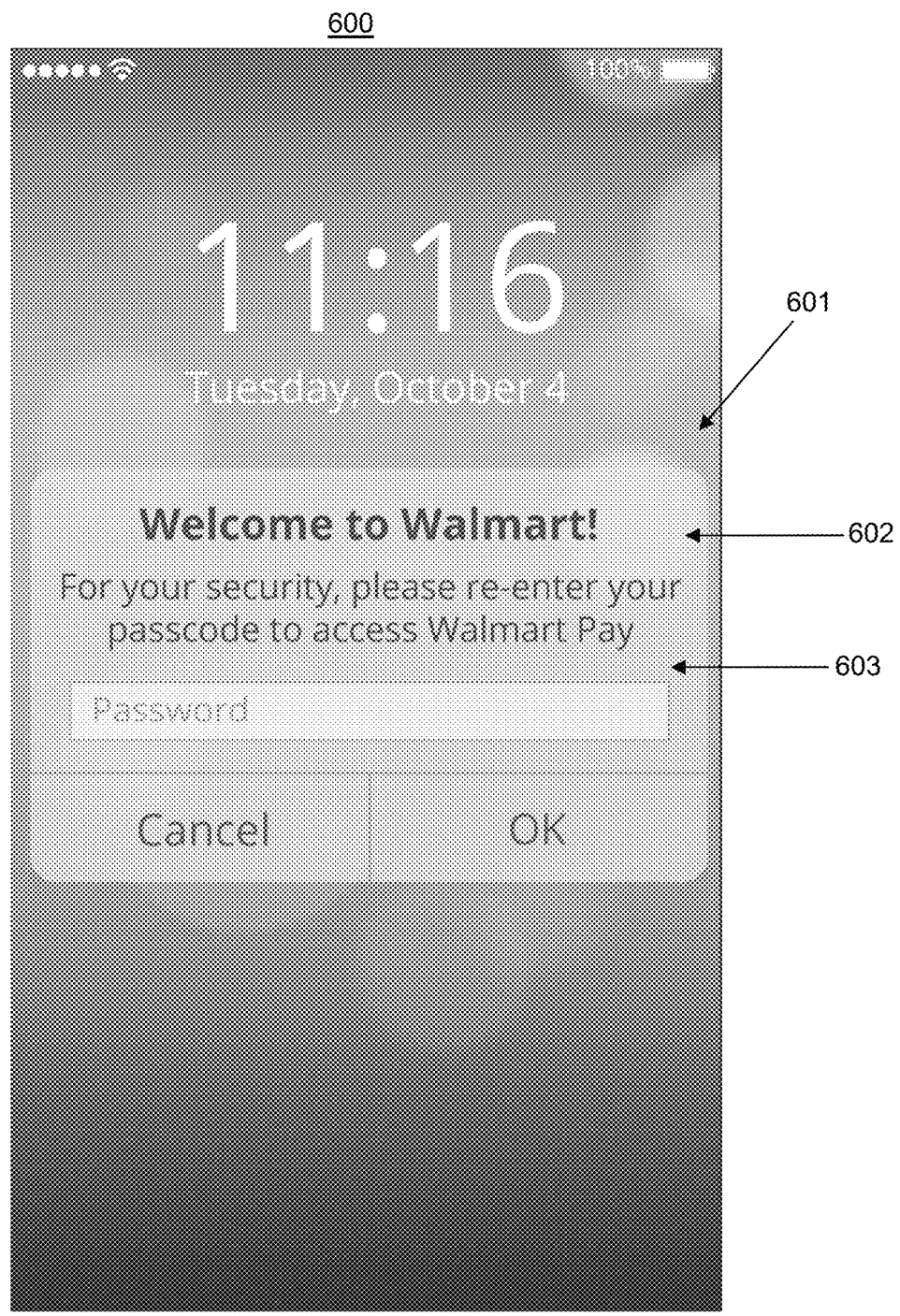
FIG. 6 illustrates an exemplary graphical user interface according to an embodiment.

In some embodiments, prompting a user for additional information in block 509 can comprise asking the user to enter a password created by the user, asking the user to enter a personal identification number (PIN) created by the user, asking the user to respond to an SMS message, asking the user to respond to a push notification on user interface of the software on the mobile device, asking the user to enter a security token, asking the user to enter a disconnected token, asking the user to enter a connected token, asking the user to answer a security question, and/or asking the user to submit biometric information (e.g., a fingerprint, retinal scan, and/or facial recognition image). In the same or different embodiments, prompting the user for additional information can comprise displaying a GUI 600 (FIG. 6) on a device of the user.

In some embodiments, the predetermined value in block 509 can depend on the choices of a system administrator and/or geofence manager with regards to a sensitivity and a risk tolerance of a particular embodiment of a fraud prevention system and/or method implemented. For example, if an administrator of a fraud prevention system and/or method wishes to have an extremely sensitive system and/or method, a predetermined value can be minimized. In an embodiment where a predetermined value is minimized, a miniscule change in a risk score 401 (FIG. 4) can place it above a predetermined value and thus trigger block 509. On the contrary, if an administrator of a system and/or method wishes to have a less sensitive fraud prevention system and/or method, then a predetermined value can be maximized. In an embodiment where the predetermined value is maximized, only a large change in a risk score 401 (FIG. 4) can trigger block 509. In some embodiments, a predetermined value in block 509 is different for different brick and mortar store locations and/or geofences. For example, brick and mortar store locations with historically higher in-store fraud, historically higher shoplifting, historically higher vandalism, etc. can have lower predetermined values than other brick and mortar store locations with lower instances of such issues Turning now to FIG. 6, an exemplary embodiment of a graphical user interface ("GUI") 600 is shown. In the same or different embodiments, GUI 600 can be part of and/or displayed by software 305, 308 (FIG. 3), which also can be part of system 300. In some embodiments, GUI 600 can comprise text and/or graphics (image) based user interfaces. In the same or different embodiments, GUI 600 can comprise a heads up display ("HUD"). When GUI 600 comprises a HUD, the GUI can be projected onto glass or plastic, displayed in midair as a hologram, or displayed on monitor 106 (FIG. 1). In various embodiments, GUI 600 can be color, or black and white. In many embodiments, GUI 600 can comprise an application running on a computer system, such as computer system 100, a user computer, and/or a server computer. In the same or different embodiments, GUI 600 can comprise a website accessed through network 304. In some embodiments, GUI 600 can comprise an eCommerce website. In the same or different embodiments, GUI 600 can be displayed as or on a virtual reality (VR) and/or augmented reality (AR) system or display.

In more particular embodiments, GUI 600 can comprise notification 601, message 602, and/or additional information field 603. In many embodiments, notification 601 can comprise a push notification, email notification, text notification, etc. In some embodiments, message 602 can comprise greeting text and/or images. In the same or different embodiments, message 602 can comprise instruction on what additional information can be submitted during block 509. In various embodiments, additional information field 603 can comprise a selectable element that allows a user to enter additional information. For example, additional information field 603 can comprise a text entry box that allows a user to enter a PIN, password, security token, etc. In the same or different embodiments, additional information field 603 can comprise a dynamic element that displays the additional information as received by an electronic device of a user. For example. in embodiments where biometric information is submitted, additional information field 603 can comprise a visual display of the biometric information (e.g., a live video of a facial recognition image captured by the electronic device of the user).

Figure 7:
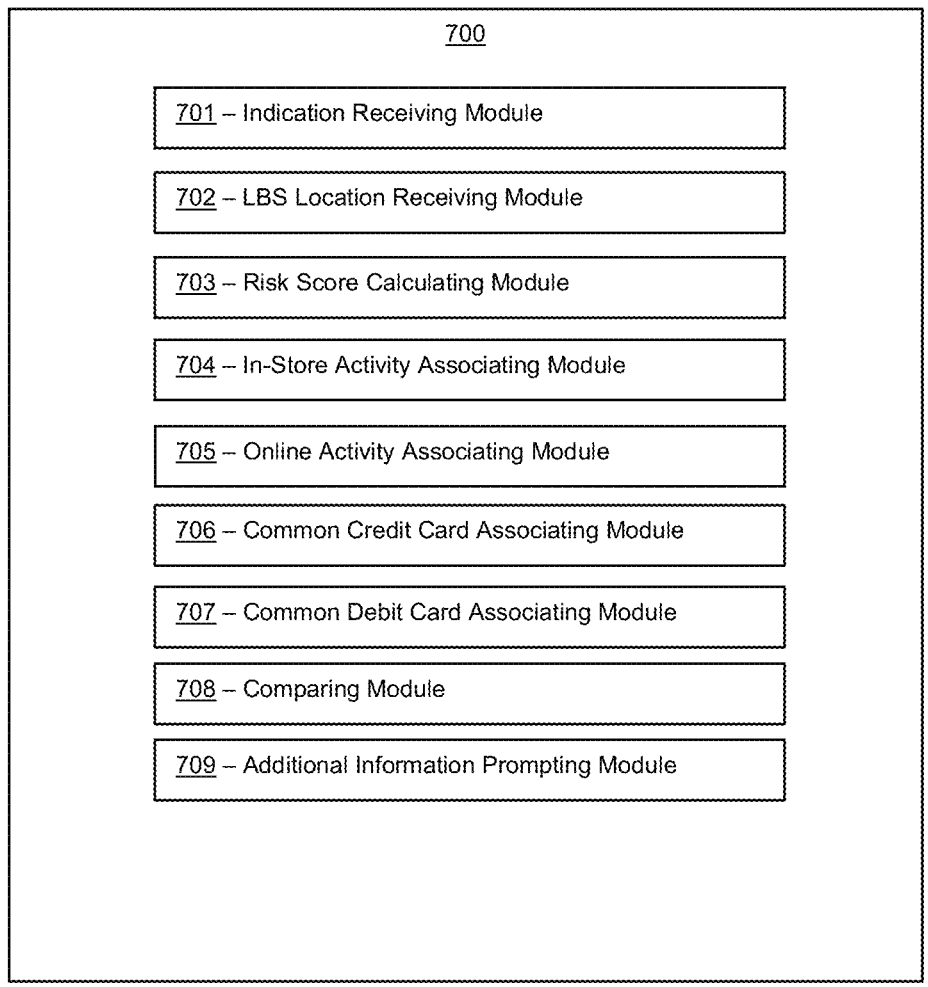
FIG. 7 illustrates a representative block diagram of a system according to an embodiment.

Turning ahead in the drawings, FIG. 7 illustrates a block diagram of a system 700 that can be employed for location based fraud prevention. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as indication receiving module 701. In many embodiments, indication receiving module 701 can store computing instructions configured to run on one or more processing modules and perform one or more acts of method 500 (FIG. 5) (e.g., activity 501 (FIG. 5)).

In many embodiments, system 700 can comprise non-transitory memory storage module 702. Memory storage module 702 can be referred to as LBS location receiving module 702. In many embodiments, LBS location receiving module 702 can store computing instructions configured to run on one or more processing modules and perform one or more acts of method 500 (FIG. 5) (e.g., activity 502 (FIG. 5)).

In many embodiments, system 700 can comprise non-transitory memory storage module 703. Memory storage module 703 can be referred to as risk score calculating module 703. In many embodiments, risk score calculating module 703 can store computing instructions configured to run on one or more processing modules and perform one or more acts of method 500 (FIG. 5) (e.g., activity 503 (FIG. 5)).

In many embodiments, system 700 can comprise non-transitory memory storage module 704. Memory storage module 704 can be referred to as in-store activity associating module 704. In many embodiments, in-store activity associating module 704 can store computing instructions configured to run on one or more processing modules and perform one or more acts of method 500 (FIG. 5) (e.g., activity 504 (FIG. 5)).

In many embodiments, system 700 can comprise non-transitory memory storage module 705. Memory storage module 705 can be referred to as online activity associating module 705. In many embodiments, online activity associating module 705 can store computing instructions configured to run on one or more processing modules and perform one or more acts of method 500 (FIG. 5) (e.g., activity 505 (FIG. 5)).

In many embodiments, system 700 can comprise non-transitory memory storage module 706. Memory storage module 706 can be referred to as common credit card associating module 706. In many embodiments, common credit card associating module 706 can store computing instructions configured to run on one or more processing modules and perform one or more acts of method 500 (FIG. 5) (e.g., activity 506 (FIG. 5)).

In many embodiments, system 700 can comprise non-transitory memory storage module 707. Memory storage module 707 can be referred to as common debit card associating module 707. In many embodiments, common debit card associating module 707 can store computing instructions configured to run on one or more processing modules and perform one or more acts of method 500 (FIG. 5) (e.g., activity 507 (FIG. 5)).

In many embodiments, system 700 can comprise non-transitory memory storage module 708. Memory storage module 708 can be referred to as comparing module 708. In many embodiments, comparing module 708 can store computing instructions configured to run on one or more processing modules and perform one or more acts of method 500 (FIG. 5) (e.g., activity 508 (FIG. 5)).

In many embodiments, system 700 can comprise non-transitory memory storage module 709. Memory storage module 709 can be referred to as additional information prompting module 709. In many embodiments, additional information prompting module 709 can store computing instructions configured to run on one or more processing modules and perform one or more acts of method 500 (FIG. 5) (e.g., activity 509 (FIG. 5)).

Risk Score Example 1

Table 1, displayed below, shows an exemplary embodiment of how a risk score 401 (FIG. 4) can be weighted by two separate geofences.

TABLE 1

| Risk Score Element | Geofence 1 | Geofence 2 |
| --- | --- | --- |
| Age of Account | x5 | x6 |
| Length Account on Device | x8 | x10 |
| New Store? | x6 | x6 |
| Days Since New Credit Card Added | x8 | x8 |
| Time Since Last Login | x9 | x9 |
| Time Between Geofence Visits | x7 | x10 |
| Predetermined Value | 300 | 250 |

For example, when a user signs up for a new account on day 1 an Age of Account risk score can comprises 10. Applying weights shown in Table 1, a weighted score for an Age of Account risk score of Geofence 1 can comprise 50 (10×5). Further, a weighted score for an Age of Account risk score of Geofence 2 can comprise 60 (10×6).

In many embodiments, weights similar to those shown in Table 1 can be applied to other detected elements of a risk score as described above. These weighted score can then be added up for a total risk score as described in Table 2 and Table 3. A total score can then be compared with a predetermined value, and when a total score exceeds the predetermined value, a user can be prompted for additional information.

Table 2, displayed below, shows an exemplary embodiment of how a risk score can be calculated for Geofence 1 and Geofence 2 weighted as described in Table 1.

TABLE 2

| Risk Score Element | Value | Element Score | Weighted Score 1 | Weighted Score 2 |
| --- | --- | --- | --- | --- |
| Age of Account | 21 Days | 5 | 25 | 30 |
| Length Account on Device | 8 days | 5 | 40 | 50 |
| New Store? | No | 0 | 0 | 0 |
| Days Since New Credit Card Added | 1 day | 10 | 80 | 80 |
| Time Since Last Login | 10 days | 0 | 0 | 0 |
| Time Between Geofence Visits | 5 days | 2 | 14 | 20 |
| Total Risk Score | | | 159 | 180 |
| Prompt for Additional Information? | | | No | No |

As can be seen in Table 2, a user created an account 21 days ago, logged into the account with a new device 8 days ago, and added a new credit card to the account 1 day ago. The user has been within both Geofence 1 and Geofence 2, and a last visit of the user to either Geofence 1 or Geofence 2 was 5 days ago. As shown in Table 2, neither risk score prompt the user for additional information.

Table 3, displayed below, shows a second exemplary embodiment of how a risk score can be calculated for Geofence 2 weighted as described in Table 1.

TABLE 3

| Risk Score Element | Value | Element Score | Weighted Score 2 |
| --- | --- | --- | --- |
| Age of Account | 21 Days | 5 | 30 |
| Length Account on Device | 8 days | 5 | 50 |
| New Store? | No | 0 | 0 |
| Days Since New Credit Card Added | 1 day | 10 | 80 |
| Time Since Last Login | 10 days | 0 | 0 |
| Time Between Geofence Visits | <1 hour | 10 | 100 |
| Total Risk Score | | | 260 |
| Prompt for Additional Information? | | | Yes |

In the embodiment displayed in Table 3, a user visits Geofence 1 as described in Table 2, and less than 1 hour later visits Geofence 2. This increases a Time Between Geofence Visits score of the user, pushes a risk score of the user over a predetermined value of 250 as shown in Table 1, and causes the system to prompt the user for additional information.

Although systems and methods for location-based fraud prevention have been described with reference to specific embodiments, it can be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it can be readily apparent that any element of FIGS. 1-7 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

We claim:

1. A system for the prevention of fraud comprising:
   one or more processors; and
   one or more non-transitory memory storage devices storing computing instructions configured to run on the one or more processors and perform:
   querying, via a software application installed on a mobile device of a user, a location of the mobile device determined by one or more of a global positioning system, a Wi-Fi positioning system, a radio frequency identification system, a near field communication system, a Bluetooth beacon system, an ultra-wide band positioning system, or an infrared positioning system;

when the location of the mobile device is within a first geofence, receiving an indication from the software application that the mobile device has entered the first geofence;

in response to receiving the indication that the mobile device has entered the first geofence, calculating a risk score for a first user account of the user, the risk score comprising an account details history of the first user account and a stolen account history of the first user account, wherein:

the account details history of the first user account indicates that one or more details of an account profile of the first user account were recently changed; and the stolen account history of the first user account indicates that the first user account has been stolen in the past;

when the risk score is below a predetermined value, activating the software application and causing the software application to display a GUI on the mobile device of the user to prompt the user for additional information via the mobile device; and in response to receiving the additional information, allowing the user to use the software application to complete a purchase within the first geofence.

2. The system of claim 1, wherein the first geofence defines a perimeter of a building.

3. The system of claim 1, wherein the risk score further comprises:

an in-person activity history of the first user account comprising at least one of:
a physical store location history of the first user account;
a shopping frequency history of the first user account; or
an in-store purchase history of the first user account;

an online activity history of the first user account comprising at least one of:
an online purchase history of the first user account; or
a mobile application purchase history of the first user account;

a device specific factor of the first user account comprising at least one of:
an account login history of the first user account; or
a number of accounts history of the first user account; or a fraudulent activity history of the first user account comprising at least one of:
a chargeback history of the first user account;
a disputed transaction history of the first user account; or
a payment method history of the first user account.

4. The system of claim 3, wherein the risk score decreases when at least one of the following occurs:

the physical store location history of the first user account indicates that the first user account has never transacted within the first geofence;

the shopping frequency history of the first user account indicates that the first user account recently transacted within a second geofence different than the first geofence;

the account login history of the first user account indicates that the first user account has not previously been logged into the mobile device via the software application;

the number of accounts history of the first user account indicates that a second user account different than the first user account has been logged into the mobile device via the software application;

the chargeback history of the first user account indicates that the first user account has initiated a chargeback to a retailer;

the disputed transaction history of the first user account indicates that the first user account has disputed a transaction with the retailer; or the payment method history indicates that a new payment method was recently added to the first user account.

5. The system of claim 3, wherein calculating the risk score further comprises:

associating at least one of the in-person activity history of the first user account or the online activity history of the first user account with the first user account based on a past transaction using at least one of a common credit card or a common debit card for both of the in-person activity history and the online activity history.

6. The system of claim 3, wherein calculating the risk score further comprises:

comparing the in-person activity history with the online activity history; and decreasing the risk score when a difference between the in-person activity history and the online activity history is detected.

7. The system of claim 6, wherein decreasing the risk score further comprises detecting a difference between in-store purchasing trends of the in-store purchase history and online purchasing trends of the online purchase history.

8. The system of claim 6, wherein decreasing the risk score further comprises detecting differences between in-store purchasing trends of the in-store purchase history and mobile application purchasing trends of the mobile application purchase history.

9. The system of claim 1, wherein the additional information comprises at least one of a password, a PIN, a response to a push notification, a security token, a disconnected token, a connected token, an answer to a security question, or a biometric reading.

10. The system of claim 1, wherein allowing the user to complete the purchase within the first geofence comprises:

allowing the user to complete the purchase within the first geofence using the mobile device.

11. A method for the prevention of fraud comprising:

querying, via a software application installed on a mobile device of a user, a location of the mobile device determined by one or more of a global positioning system, a Wi-Fi positioning system, a radio frequency identification system, a near field communication system, a Bluetooth beacon system, an ultra-wide band positioning system, or an infrared positioning system;

when the location of the mobile device is within a first geofence, receiving an indication from the software application that the mobile device has entered the first geofence;

in response to receiving the indication that the mobile device has entered the first geofence, calculating a risk score for a first user account of the user, the risk score comprising an account details history of the first user account and a stolen account history of the first user account, wherein:

the account details history of the first user account indicates that one or more details of an account profile of the first user account were recently changed; and the stolen account history of the first user account indicates that the first user account has been stolen in a past;

when the risk score is below a predetermined value, activating the software application and causing the software application to display a GUI on the mobile device of the user to prompt the user for additional information via the mobile device; and in response to receiving the additional information, allowing the user to use the software application to complete a purchase within the first geofence.

12. The method of claim 11, wherein the first geofence defines a perimeter of a building.

13. The method of claim 11, wherein the risk score further comprises:

an in-person activity history of the first user account comprising at least one of:
- a physical store location history of the first user account;
- a shopping frequency history of the first user account; or
- an in-store purchase history of the first user account;

an online activity history of the first user account comprising at least one of:
- an online purchase history of the first user account; or
- a mobile application purchase history of the first user account;

a device specific factor of the first user account comprising at least one of:
- an account login history of the first user account; or
- a number of accounts history of the first user account; or a fraudulent activity history of the first user account comprising at least one of:
- a chargeback history of the first user account;
- a disputed transaction history of the first user account; or
- a payment method history of the first user account.

14. The method of claim 13, wherein the risk score decreases when at least one of the following occurs:

the physical store location history of the first user account indicates that the first user account has never transacted within the first geofence in the past;

the shopping frequency history of the first user account indicates that the first user account recently transacted within a second geofence different than the first geofence;

the account login history of the first user account indicates that the first user account has not previously been logged into the mobile device via the software application;

the number of accounts history of the first user account indicates that a second user account different than the first user account has been logged into the mobile device via the software application;

the chargeback history of the first user account indicates that the first user account has initiated a chargeback to a retailer;

the disputed transaction history of the first user account indicates that the first user account has disputed a transaction with the retailer; or the payment method history indicates that a new payment method was recently added to the first user account.

15. The method of claim 13, wherein calculating the risk score further comprises:

associating at least one of the in-person activity history of the first user account or the online activity history of the first user account with the first user account based on a past transaction using at least one of a common credit card or a common debit card for both of the in-person activity history and the online activity history.

16. The method of claim 13, wherein calculating the risk score further comprises:

comparing the in-person activity history with the online activity history; and decreasing the risk score when a difference between the in-person activity history and the online activity history is detected.

17. The method of claim 16, wherein decreasing the risk score further comprises detecting a difference between in-store purchasing trends of the in-store purchase history and online purchasing trends of the online purchase history.

18. The method of claim 16, wherein decreasing the risk score further comprises detecting differences between in-store purchasing trends of the in-store purchase history and mobile application purchasing trends of the mobile application purchase history.

19. The method of claim 11, wherein the additional information comprises at least one of a password, a PIN, a response to a push notification, a security token, a disconnected token, a connected token, or a biometric reading.

20. The method of claim 11, wherein allowing the user to complete the purchase within the first geofence comprises:

allowing the user to complete the purchase within the first geofence using the mobile device.

* * * * *